United States Patent
Schoen et al.

[15] 3,682,990
[45] Aug. 8, 1972

[54] DEMULSIFIER FOR WATER-PETROLEUM EMULSIONS

[72] Inventors: William Schoen; Leo Landau, both of Houston, Tex.

[73] Assignee: Texaco Inc., New York, N.Y.

[22] Filed: April 15, 1970

[21] Appl. No.: 33,145

Related U.S. Application Data

[62] Division of Ser. No. 605,233, Dec. 28, 1966, Pat. No. 3,553,149.

[52] U.S. Cl. ............... 260/410.5, 252/331, 252/340
[51] Int. Cl. ........................ C07c 69/28, B01d 17/04
[58] Field of Search ................ 260/410.5, 452, 410

[56] References Cited

UNITED STATES PATENTS 2,446,045    7/1948    De Groote et al. ...... 260/410.5

OTHER PUBLICATIONS

Chemical Abstracts 61, 6843f (1964)

*Primary Examiner*—Lewis Gotts
*Assistant Examiner*—Diana G. Rivers
*Attorney*—K. E. Kavanagh and Thomas H. Whaley

[57] ABSTRACT

A demulsifier for resolving water-petroleum emulsions is prepared by reacting together a paraffin wax oxidate and an alkyl phenol-ethylene oxide reaction product. One demulsifier is made from a paraffin wax oxidate having a neutralization number between 215 and 240 which is prepared from a paraffin wax having a melting point between 115° and 125° F. and an oil content less than 15 weight percent. This oxidate is reacted with a nonylphenol-ethylene oxide reaction product to produce the demulsifier.

4 Claims, No Drawings

3,682,990

DEMULSIFIER FOR WATER-PETROLEUM EMULSIONS

CROSS-REFERENCE TO RELATED APPLICATION

This is a division of application Ser. No. 605,233, filed Dec. 28, 1966, now U.S. Pat. No. 3,533,149.

BACKGROUND OF THE INVENTION

This invention relates to a water-oil demulsifier, the preparation of the demulsifier and its use in breaking water-oil emulsions. In particular it relates to a reaction product of two constituents and the use of the reaction product in resolving water-in oil emulsions hereinafter referred to as water-petroleum emulsions, especially those encountered in crude oil producing fields and petroleum refineries.

Although petroleum and water are essentially immiscible, they often attain a condition of intimate and apparent permanent emulsification. A generally accepted theory to explain the unwillingness of the dispersed material to coalesce is the presence of a third substance, termed an emulsifying agent. Minute particles of this "emulsifying agent" accumulate and are retained on the interface of the discontinuous phase by adsorption forces. The emulsifying agent may be either a finely divided colloidal substance insoluble in oil or water or a substance soluble in either the oil or the water. It is known that finely-divided solid substances such as clay will promote emulsification. Further, it is known that the liquid which preferentially wets the emulsifying agent will invariably be the continuous phase of the emulsion. For example, finely-divided clay is wet more readily by water than by oil and will form oil-in-water emulsions whereas carbon black and oil-saturated clay are more readily wet by oil than by water and form water-in-oil emulsions. Similarly when soluble emulsifying agents are present, the liquid in which the emulsifying agent is soluble will become the external phase. Sodium soaps, for example, are more soluble in water than in oil and thus form oil-in-water emulsions. On the other hand calcium soaps or asphaltic materials, being soluble in oil but not in water, form water-in-oil emulsions. Naturally occurring crude petroleum emulsions are nearly always of the water-in-oil type though occasionally small quantities of the inverted type are encountered.

Generally speaking, the naphthene-base crudes contain asphaltic substances and emulsify readily, while the pure paraffin oils show less tendency to do so. These asphaltic substances act as emulsifying agents rendering the oil the external or continuous phase. This explains why petroleum emulsions are nearly always of the water-in-oil type. This invention is directed to the resolution of emulsions of this type, i.e., water-in-oil emulsions, and which are referred to herein as water-oil or water-petroleum emulsions.

The interfacial tension between oil and pure water is such that the oil ordinarily tends to spread itself in a thin film over the surface of the water. If the interfacial tension is sufficiently reduced, emulsions are much more readily formed. On the other hand, substances added to the mixture which tend to increase the interfacial tension make emulsification more difficult. It is theorized then that the emulsifying agent reduces the interfacial tension and produces emulsions. Where water is the internal phase, as in most of the crude petroleum emulsions encountered, the emulsifying agent is often asphaltic and therefore oleophilic in character. Such emulsifying agents may be thought of as immersed in the oil but concentrated at the oil-water interface. Therefore if some substance could be introduced into the emulsion that would also be attracted to the oil-water interface and counteract the influence of the emulsifying agent, demulsification would be promoted. Resolution of the emulsion, in this case, can be the result of the change of the emulsifying agent itself, rendering it hydrophilic, or it may be due to direct influence upon the surface tension of the water, thus altering the interfacial tension relationships.

It is known that many substances counteract the effect of the emulsifying agent. Finely-divided silica, iron oxide and materials of similar nature influence the interfacial tension relationships when dispersed throughout a water-in-oil emulsion and slowly bring about demulsification. Certain water soluble salts such as sodium chloride will often operate to increase the oil-water interfacial tension producing a similar result. Since it is known that the water droplets in the petroleum emulsion are electrically charged, the use of chemical electrolytes having the properties of neutralizing the electric charge on the water droplets could be expected to aid in the demulsification. Also, where highly dispersible colloidal substances accumulate at the oil-water interface and are functioning as emulsifying agents, their action may be counteracted by adding a flocculating agent such as sodium chloride or sodium sulfate. In addition, it is known that some organic compounds which are soluble in both oil and water will promote demulsification. For example, when phenol or cresylic acid is dissolved in the oil phase it is thought that the diffusion of such materials across the oil-water interface from the oil into the water produces a change in interfacial tension, thus aiding demulsification.

The equipment and techniques employed in chemically breaking a water-petroleum emulsion are well known in the art. For example, the demulsifier is often diluted or suspended in an inert liquid carrier and either added to a pipeline carrying the emulsion or a tank containing the emulsion. Turbulent flow conditions in the pipe and agitation of the tank contents greatly aid the distribution of the demulsifier throughout the oil mass. To aid in settling out the water the emulsion being treated is allowed to remain at rest in a tank so that the water droplets will have time to coalesce and settle out from the oil. In some instances the demulsification process is hastened by heating above ambient conditions to temperatures often as high as 180° F. In addition to hastening demulsification heating usually permits a smaller amount of chemical to be used to achieve the desired result. One part of reagent to 10,000 or more parts of oil in the emulsion is usually sufficient to break most water-petroleum emulsions although treating ratios ranging from 1:8,000 to 1:40,000 are often employed. In the case of light oil, one gallon of reagent to 100 barrels of oil is a common ratio.

SUMMARY OF THE INVENTION

We have discovered, and this constitutes out invention, that by incorporating in a water-petroleum emulsion, an emulsion-breaking amount of a product of reaction of a paraffin wax oxidate and an alkyl phenol-ethylene oxide reaction product, the emulsion can be resolved into two phases so that the oil may be reclaimed and added to refinery feed stocks for processing. Further, we have discovered how to prepare this product of reaction. Our invention therefore incorporates the demulsifier, its method of preparation and its use in breaking or resolving water-petroleum emulsions.

DESCRIPTION OF THE PREFERRED EMBODIMENTS

The demulsifier of out invention is the product of reaction, i.e., the reaction mixture, of a paraffin wax oxidate and an alkyl phenol-ethylene oxide reaction product.

The paraffin wax oxidate component of our demulsifier combination may be any of the commercially available paraffin wax oxidates, thus, either hydrolyzed or unhydrolyzed wax oxidates may be used. One particularly useful paraffin wax oxidate has a neutralization number between 215 and 240 and is prepared from a paraffin wax having a melting point between 115° and 125° F. and an oil content of less than about 15 weight percent.

The second reactant is the reaction product of a $C_6$–$C_{12}$ alkyl phenol and ethylene oxide combined in a mole ratio of alkyl phenol to ethylene oxide of between 1:4 and 1:50. A particularly useful alkyl phenol-ethylene oxide reaction product is commercially available from Jefferson Chemical Co. Inc. under the trade name of SURFONIC N–300. This material is made by reacting nonylphenol with ethylene oxide in a mole ratio of nonylphenol to ethylene oxide of 1:30. Other reaction products of the same compounds, wherein the ratio may range from 1:12 to 1:20, may also be employed. However, the preferred ratio is 1:30.

Although catalysts such as CuO, $ZnSO_4$, HCl, and $H_2SO_4$ may be used in preparing the demulsifier of our invention, we have found that catalysts are not necessary to produce a satisfactory product if the reactants are heated for prolonged periods of time at elevated temperatures. For example, a useful material is prepared when the paraffin wax oxidate comprises about 15 to about 65 weight percent of the mixture with the balance being the alkyl phenol-ethylene oxide reaction product, and the mixture is maintained at a temperature of 300° to 450° F. for a period of about 8 to 72 hours. Preferably, the temperature is maintained between 325° and 425° F. for 10 to 20 hours.

Our novel demulsifier may be added to water-petroleum emulsions by methods well known in the art as described hereinbefore. For convenience in handling, the demulsifier may be dissolved in an inert carrier, such as an aromatic solvent — toluene and benzene being representative of the more commonly available ones. The demulsifier is conveniently diluted to form a 2 volume percent solution for mixing with the emulsion to be treated.

The amount of active demulsifier or its 2 percent solution required to resolve a particular water-oil emulsion is not predictable since it depends on numerous variables. For example, the treating temperature, the type and quality of crude oil, the saline content of the water and the relative quantities of oil and water in the emulsion are among the major variables which directly effect the quality of demulsifier needed to break an emulsion. It is possible, however, to determine the "emulsion-breaking amount" of demulsifier required. Tests well-known in the art may be performed on the emulsion in a short time and with a minimum of equipment to select not only the most effective treating compound from a group of demulsifiers but also the most effective ratio of treating chemical to emulsion. One such test, a so-called "bottle test" is particularly useful with the demulsifiers of our invention and is described in Chapter IX of "Treating Oil Field Emulsions," Petroleum Extension Service of the University of Texas, 2d Ed. (1955). In this method varying amounts of treating solution are added to 100 milliliter samples of an emulsion to determine the effectiveness of the treating solution and the minimum quantity of demulsifier necessary to break the emulsion. The sharpness and extent of the resolution of the emulsion and the clarity of the phases are determined visually.

It should be noted that using less than the minimum quantity of demulsifier as determined by the bottle test will not produce a resolution of the emulsion. On the other hand, employing excess quantities of the demulsifier will neither improve the demulsification process itself nor produce oil of superior quality. Thus the minimum amount of demulsifier necessary to break an emulsion is also the optimum amount to use, taking into consideration of course the reproducibility of the bottle test and the ability of the treating equipment in the field to add precise quantities of the demulsifier solution to the emulsion.

The effectiveness or efficiency of a particular demulsifier is often expressed in terms of the barrels of oil recovered per gallon of active ingredient in the treating solution. With the demulsifiers of our invention efficiencies of 500 to 1,500 barrels of oil recovered per gallon of demulsifier are often achieved, with efficiencies ranging from 100 to 3,000 being not unusual.

The following examples further illustrate the invention, but are not to be construed as limitations thereof.

EXAMPLE I

This example illustrates the preparation of the demulsifiers of our invention.

Unhydrolyzed wax oxidate was added to a nonylphenol-ethylene oxide reaction product sold under the tradename of SURFONIC N–300 by Jefferson Chemical Co. Inc. The unhydrolyzed wax oxidate had the following properties:

| | |
|---|---|
| Neutralization No. | 218 |
| Saponification No. | 430 |
| Unsaponifiable, % | 4.6 |
| Equiv. Molecular wt. | 258 |

Several ratios of oxidate to reaction product were employed and the mixtures were heated for prolonged periods of time. The ratios, reaction conditions and other pertinent data are shown in Table A below.

TABLE A

| Mixture | Unhyd. Oxidate | N-300 | Temp. | Time | Neut. No. of Mixture | |
|---|---|---|---|---|---|---|
| | wt. % | wt. % | °F. | hr. | Before | After |
| 1 | 15 | 85 | 420 | 72 | 31.2 | 5.7 |

| 2 | 35 | 65 | 420 | 72   | 76.3 | 27.5 |
| 3 | 50 | 50 | 400 | 37.5 | 109  | 44   |
| 4 | 65 | 35 | 420 | 72   | 142  | 3.2  |

In similar fashion various mixtures of hydrolyzed wax oxidate and SURFONIC N–300 were combined and heated for prolonged periods. The hydrolyzed wax oxidate had the following properties:

| | |
|---|---|
| Neutralization No. | 192 |
| Saponification No. | 253 |
| Unsaponifiable, % | 8.3 |
| Equiv. Molecular wt. | 292 |

Representative data from these runs are set forth in Table B below.

TABLE B

| Mixture | Hyd. Oxidate | N-300 | Temp. | Time | Neut. No. of Mixture | |
|---|---|---|---|---|---|---|
| | wt. % | wt. % | °F. | hr. | Before | After |
| 5 | 16 | 84 | 400 | 16 | 35.2 | 12.5 |
| 6 | 35 | 65 | 400 | 40 | 77.3 | 25.9 |
| 7 | 50 | 50 | 400 | 24 | 109  | 30.7 |
| 8 | 65 | 35 | 400 | 8  | 142  | 66.3 |

EXAMPLE II

This illustrates the emulsion breaking properties of the demulsifiers of our invention as evaluated by a "-bottle test."

In this test, 100 ml. of a water-oil emulsion were placed in each of several 6 ounce graduated prescription bottles. A two volume per cent solution of the particular demulsifier under study was prepared utilizing as a carrier a catalytic reformer aromatic solvent having a 400°–700° F. boiling point. Increasing amounts of the two per cent solution of demulsifier ranging from 0.1 to 2 milliliters were added to the series of bottles containing the emulsion under test. Each of the bottles and its contents were shaken for 1 minute and placed in a water bath maintained at 140° F. for 40 minutes. The bottles were then examined and the one showing the sharpest separation of bright oil and water was selected. After noting the volume of demulsifier solution required to produce this optimum resolution of the emulsion, the separated oil was analyzed for basic sediment and water (B S & W) by centrifuging it with a known volume of xylene. The B S & W was measured as per cent by volume. In all evaluations of the demulsifier by the bottle test, the same emulsion was utilized. It was procured from a producing crude oil well in Harris County, Texas and was composed of approximately a 1:1 ratio of water and the low API gravity (21.6°) upper Texas Gulf Coast crude oil.

The effectiveness of each mixture tested was evaluated by calculating its "emulsion-breaking efficiency" in terms of barrels of oil recovered per gallon of active demulsifier in the two per cent solution. The demulsifying properties of each of the mixtures of Example I were evaluated by the bottle test and its efficiency computed from the optimum quantity of demulsifier required. The results are set forth in Table C. A control sample of emulsion to which no demulsifier was added showed no substantial separation after the shaking and heating procedures employed in the bottle test. Six of the eight mixtures tested produced a separation of the emulsion into two phases to various degrees. Each of the mixtures which resolved the emulsion achieved its most effective separation with varying amounts of demulsifier. In Table C the ratio, "milliliters of oil/milliliters $H_2O$" is a measurement of the relative quantities of the two phases of the resolved emulsion.

TABLE C

| Mixture | Ratio ml Oil/ml $H_2O$ | BS&W % | Barrels Oil per Gallon Demulsifier |
|---|---|---|---|
| 1 | 50/50 | 1.4 | 795 |
| 2 | 50/50 | 0.8 | 1320 |
| 3 | 55/45 | 0.6 | 1090 |
| 4 | 60/40 | 0.7 | 1190 |
| 5 | 70/30 | 1.0 | 556 |
| 6 | 66/34 | 0.8 | 1050 |
| 7 | Low | – | – |
| 8 | Low | – | – |
| Control | Unsatisfactory | - No substantial separation | |

In addition to the control test to which no demulsifier mixture was added, tests were run on the individual components from which the demulsifier mixtures were prepared, i.e., SURFONIC N–300, hydrolyzed wax oxidate and unhydrolyzed wax oxidate. In all three instances the material tested proved to be a poor demulsifier. For example, the hydrolyzed wax oxidate showed a demulsifying efficiency of merely 25 barrels of oil recovered per gallon of oxidate, while the SURFONIC N–300 showed an efficiency of only 188 barrels per gallon.

In summary, the bottle test demonstrated that the reaction products of our invention are efficient emulsion breakers.

EXAMPLE III

This illustrates the emulsion breaking properties of the demulsifiers of our invention in a field test at a crude oil producing well. This test was conducted at the Harris County well which served as the source of the emulsions used in the bottle tests of Example 2. Conventional oil well chemical injection and emulsion treating equipment was utilized for the test.

In one trial wherein the treating mixture was maintained at 110° F., a 2 percent solution of mixture 1 of Example 1 was employed and produced a sharp separation of the emulsion into a water phase and an oil phase at an efficiency of 2,400 barrels of oil produced per gallon of active demulsifier.

In a second test at the same well utilizing the same equipment and treating conditions, mixture 5 of Example 1 demonstrated an efficiency of 3,080 barrels per quart.

The foregoing examples are illustrative of the effectiveness of the demulsifiers of our invention in breaking emulsions of water and oil. From the bottle tests it can be seen that the individual constituents used in preparing our demulsifier were relatively ineffective when used alone, thus emphasizing the unexpectedness of the demulsifying effect of the product of reaction of our invention.

Obviously, many modifications and variations of our invention, as hereinbefore set forth, may be made without departing from the spirit and scope thereof and only such limitations should be imposed as are indicated in the appended claims.

We claim:
1. A composition of matter for use in demulsifying water-in-oil emulsions which comprises:
the product of reaction of
a. about 15 to about 65 weight percent of a paraffin wax oxidate having a neutralization number of between 215 and 240, said oxidate prepared from a paraffin wax having a melting point between 115° and 125° F. and an oil content of less than 15 weight percent, and
b. about 85 to about 35 weight percent of a $C_6$ to $C_{12}$ alkyl phenol-ethylene oxide reaction product wherein the mole ratio of alkyl phenol to ethylene oxide is between 1:4 and 1:50.

2. A composition of matter according to claim 1 where the alkyl phenol is nonylphenol and the mole ratio is 1:30.

3. A process of preparing a water-in-oil demulsifier which comprises:
a. admixing (i) a paraffin wax oxidate having a neutralization number of between 215 and 240, said oxidate prepared from a paraffin wax having a melting point between 115° and 125° F. and an oil content of less than 15 weight percent and (ii) a $C_6$ to $C_{12}$ alkyl phenol-ethylene oxide reaction product in a mole ratio of alkyl phenol to ethylene oxide of between 1:4 and 1:50, said wax oxidate constituting about 15 to about 65 weight percent the mixture and the reaction product constituting the balance,
b. maintaining the mixture at a temperature of 300° to 450° F. for 8 to 72 hours.

4. A process according to claim 3 wherein
the alkyl phenol is nonylphenol,
the mole ratio is 1:30, and
the temperature is maintained between 325° and 425° F. for 10 to 20 hours.

* * * * *